US009121989B2

(12) United States Patent
Kuromizu

(10) Patent No.: US 9,121,989 B2
(45) Date of Patent: Sep. 1, 2015

(54) ILLUMINATING DEVICE, DISPLAY DEVICE, AND TELEVISION RECEIVING DEVICE

(75) Inventor: Yasumori Kuromizu, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 270 days.

(21) Appl. No.: 13/816,765

(22) PCT Filed: Jun. 9, 2011

(86) PCT No.: PCT/JP2011/063247
§ 371 (c)(1),
(2), (4) Date: Feb. 13, 2013

(87) PCT Pub. No.: WO2012/023333
PCT Pub. Date: Feb. 23, 2012

(65) Prior Publication Data
US 2013/0155720 A1    Jun. 20, 2013

(30) Foreign Application Priority Data
Aug. 20, 2010 (JP) ................................. 2010-184621

(51) Int. Cl.
*F21V 7/04* (2006.01)
*F21V 8/00* (2006.01)
*G02F 1/1335* (2006.01)
(52) U.S. Cl.
CPC .............. *G02B 6/0068* (2013.01); *G02B 6/009* (2013.01); *G02B 6/0073* (2013.01); *G02B 6/0085* (2013.01); *G02F 1/133615* (2013.01)
(58) Field of Classification Search
USPC ............... 362/97.1–97.3, 609, 612, 613, 615, 362/617, 618, 627
See application file for complete search history.

(56) References Cited

U.S. PATENT DOCUMENTS

| 2004/0201978 | A1 | 10/2004 | Kuo |
| 2005/0157519 | A1 | 7/2005 | Kuo |
| 2009/0115931 | A1* | 5/2009 | Yoo ................................. 349/58 |
| 2009/0147353 | A1 | 6/2009 | Yang et al. |

FOREIGN PATENT DOCUMENTS

| JP | 3102801 U | 7/2004 |
| JP | 2004-303578 A | 10/2004 |
| JP | 2007-266590 A | 10/2007 |
| JP | 2008-084790 A | 4/2008 |
| JP | 2009-158479 A | 7/2009 |
| JP | 2009-267279 A | 11/2009 |

OTHER PUBLICATIONS

Official Communication issued in International Patent Application No. PCT/JP2011/063247, mailed on Jul. 12, 2011.

* cited by examiner

*Primary Examiner* — Meghan Dunwiddie
(74) *Attorney, Agent, or Firm* — Keating & Bennett, LLP

(57) ABSTRACT

Provided is an illuminating device capable of uniformalizing intensity distribution in a plane of light that is emitted to the outside even when a light source includes a non-emitting portion or a low reflective portion. The illuminating device includes a light source including a plurality of light-emitting elements, and a light guide member including an entrance face opposing the light source, from which light emitted from the light source enters the inside of the light guide member, wherein the light source includes a non-emitting portion where the light-emitting elements are not disposed, and wherein light projected from a portion of the light source, the portion being close to the non-emitting portion, onto the entrance face of the light guide member is higher in intensity than light projected from the other portion of the light source onto the entrance face of the light guide member.

12 Claims, 10 Drawing Sheets

ILLUMINATING DEVICE, DISPLAY DEVICE, AND TELEVISION RECEIVING DEVICE

TECHNICAL FIELD

The present invention relates to an illuminating device, and a display device, and a television receiving device, and more specifically relates to an illuminating device favorably used for a light source of a display device including a non-self-emissive display panel such as a liquid crystal display panel, a display device including the illuminating device, and a television receiving device including the illuminating device.

BACKGROUND ART

A display device including a transmissive or transflective display panel (e.g., a transmissive or transflective liquid crystal display panel) usually includes an illuminating device (referred to also as a "backlight unit") disposed behind the display panel. Light emitted from the illuminating device is projected onto a back face of the display panel, whereby an image is displayed visible on a front face of the display panel.

A side light type illuminating device (referred to also as a "side light type backlight unit" or an "edge light type backlight unit") is sometimes used in the display device. A conventionally-used general side light type illuminating device includes a light source board that defines a linear light source, and a light guide plate arranged to convert light emitted from the light source board into planar light (to convert the light source board into a planar light source). Then, the light emitted from the light source board enters the inside of the light guide plate from a face on a lateral side (an end face of a peripheral portion in a plane direction) of the light guide plate, and is emitted to the outside from a front face of the light guide plate. The light emitted from the front face of the light guide plate is projected onto a back face of the display panel.

It is preferable that the light projected onto the back face of the display panel has uniform intensity distribution in its plane direction in order to prevent luminance unevenness from developing in the image that the display device displays. Thus, it is necessary to uniformalize intensity distribution of the light that enters the inside of the light guide plate.

The light source board used in the side light type illuminating device generally includes a plurality of light-emitting elements, and a long and narrow strip-shaped board. The plurality of light-emitting elements are mounted on the board while disposed in series in a longitudinal direction of the board. Uniformly spacing the light-emitting elements on the board allows the linear light (i.e., the light in the longitudinal direction of the board) to have uniform intensity distribution (see PTL 1 and PTL 2). Thus, the light that enters the inside of the light guide plate has uniform intensity distribution. However, there arises a problem as follows. The board sometimes includes an identifying code that shows the type of the light source (i.e., a printed identification character). In addition, the board sometimes includes a screw hole arranged to fix the board to the illuminating device. In addition, the board sometimes includes a connector arrange to receive a power supply from the outside. Thus, the light-emitting elements need to be disposed so as to avoid the identifying code, the screw hole or the connector, so that the light-emitting elements on the board cannot be uniformly spaced, sometimes.

In addition, the light that leaks out of the light guide plate is reflected by a surface of the board to reenter the inside of the light guide plate. Because the identifying code on the board, the connector on the board, or a head of a screw arranged to fix the board sometimes have a lower reflectivity than the board surface, the light that is reflected by the identifying code, the connectors or the screw head to reenter the inside of the light guide plate is lower in intensity than the light reflected by the other portion of the board surface. For this reason, when a portion of lower reflectivity exists locally on the board surface, the light that enters the inside of the light guide plate becomes non-uniform in intensity.

Thus, the light that enters the inside of the light guide plate from a portion of the light guide plate, the portion opposing the identifying code, the screw head or the connector, is lower in intensity than the light that enters from the other portions. Consequently, intensity distribution in a plane of the light emitted from the front face of the light guide plat sometimes becomes non-uniform.

CITATION LIST

Patent Literature

PTL 1: JP2008-084790
PTL 2: JP2007-266590

SUMMARY OF INVENTION

Technical Problem

In view of the problems described above, an object of the present invention is to provide an illuminating device that is capable of uniformalizing intensity distribution in a plane direction of emitted light, or an illuminating device that is capable of uniformalizing intensity distribution in a plane direction of light that enters the inside of a light guide member (in other words, capable of preventing or minimizing non-uniformalization of the intensity distribution), or to provide a display device that is capable of preventing luminance unevenness from developing in an image to be displayed.

Solution to Problem

To achieve the objects and in accordance with the purpose of the present invention, an illuminating device of the present invention includes a light source including a board and a plurality of light-emitting elements mounted on the board, and a light guide member including an entrance face opposing the light source, from which light emitted from the light source enters the inside of the light guide member, wherein the light source includes a non-emitting portion where the light-emitting elements are not disposed, and wherein light projected from a portion of the light source, the portion being close to the non-emitting portion, onto the entrance face of the light guide member is higher in intensity than light projected from the other portion of the light source onto the entrance face of the light guide member.

It is preferable that a space between the light-emitting elements on the portion close to the non-emitting portion is smaller than a space between the light-emitting elements on the other portion.

It is preferable that spaces between the light-emitting elements get smaller as the light-emitting elements get closer to the non-emitting portion.

It is preferable that one or more light-emitting elements close to the non-emitting portion are arranged to emit light higher in intensity than the light-emitting elements on the other portion.

It is preferable that the light-emitting elements define LED packages including LED chips, and that the number of each LED chip included in the one or more light-emitting elements close to the non-emitting portion is larger than the number of each LED chip included in the other light-emitting elements.

It is preferable that the light-emitting elements define light-emitting elements arranged to emit different kinds of light that are different in intensity, and that the one or more light-emitting elements close to the non-emitting portion define the light-emitting elements arranged to emit the light higher in intensity than the light-emitting elements on the other portion.

It is preferable that electric power supplied to the one or more light-emitting elements close to the non-emitting portion is higher than electric power that is supplied to the light-emitting elements on the other portions.

It is preferable that the one or more light-emitting elements close to the non-emitting portion include cooling mechanisms.

It is preferable that the light source defines a plurality of light sources disposed side by side, and that each non-emitting portion includes at least one of a printed identification character disposed on each board, a screw arranged to fix each board, a power supply connector disposed on each board, and a space between the boards.

In another aspect of the present invention, an illuminating device includes a light source including a plurality of light-emitting elements, and a light guide member including an entrance face opposing the light source, from which light emitted from the light source enters the inside of the light guide member, wherein the light source includes a low reflective portion that has a lower reflectivity than the other portion, and wherein light projected from a portion of the light source, the portion being close to the low reflective portion, onto the entrance face of the light guide member is higher in intensity than light projected from the other portion of the light source onto the entrance face of the light guide member.

It is preferable that a space between the light-emitting elements on the portion close to the low reflective portion is smaller than a space between the light-emitting elements on the other portion.

It is preferable that spaces between the light-emitting elements get smaller as the light-emitting elements get closer to the low reflective portion.

It is preferable that one or more light-emitting elements close to the low reflective portion are arranged to emit light higher in intensity than the light-emitting elements on the other portion.

It is preferable that the light-emitting elements define LED packages including LED chips, and that the number of each LED chip included in the one or more light-emitting elements close to the low reflective portion is larger than the number of each LED chip included in the other light-emitting elements.

It is preferable that the light-emitting elements define light-emitting elements arranged to emit different kinds of light that are different in intensity, and that the one or more light-emitting elements close to the low reflective portion define the light-emitting elements arranged to emit the light higher in intensity than the light-emitting elements on the other portion.

It is preferable that the light source defines a plurality of light sources that are disposed side by side and include boards, and that each low reflective portion includes at least one of a printed identification character disposed on each board, a screw arranged to fix each board, a power supply connector disposed on each board, and a space between the boards.

It is preferable that the light source defines a linear light source, and the light guide member defines an optical member arranged to convert light emitted from the light source into planar light to emit the planar light to the outside.

It is preferable that the board of the light source has a long and narrow strip shape, and that the light-emitting elements are disposed in series in a longitudinal direction of the board.

It is preferable that the light sources surround a periphery of the optical member.

It is preferable that the light sources are disposed at positions opposing each other while sandwiching the optical member.

It is preferable that the light-emitting elements define LED packages, each LED package including a blue light-emitting LED element coated with a fluorescent material that has an emission peak wavelength in a yellow region, and the LED packages are arranged to emit white light.

It is preferable that the light-emitting elements define LED packages, each LED package including a blue light-emitting LED element coated with a fluorescent material that has an emission peak wavelength in a green region and a red region, and the LED packages are arranged to emit white light.

It is preferable that the light-emitting elements define LED packages, each LED package including a blue light-emitting LED element coated with a fluorescent material that has an emission peak wavelength in a green region, and a red light-emitting LED element, and the LED packages are arranged to emit white light.

It is preferable that the light-emitting elements define LED packages, each LED package including an LED package arranged to emit red light, an LED package arranged to emit green light, and an LED package arranged to emit blue light, and the LED packages are arranged to emit white light.

It is preferable that each light-emitting element includes an ultraviolet-emitting element, and a fluorescent material arranged to receive ultraviolet light emitted from the ultraviolet-emitting element to be pumped to emit visible light.

It is preferable that each light-emitting element includes an ultraviolet-emitting element, a fluorescent material arranged to receive ultraviolet light emitted from the ultraviolet-emitting element to be pumped to emit red light, a fluorescent material arranged to receive ultraviolet light emitted from the ultraviolet-emitting element to be pumped to emit green light, and a fluorescent material arranged to receive ultraviolet light emitted from the ultraviolet-emitting element to be pumped to emit blue light, and the light-emitting elements are arranged to emit white light.

Yet, in another aspect of the present invention, a display device of the present invention includes the illuminating device of the present invention, and a display panel arranged to receive light from the illuminating device.

It is preferable that the display panel defines a liquid crystal display panel.

Yet, in another aspect of the present invention, a television receiving device of the present invention includes the display panel of the present invention.

Advantageous Effects of Invention

Having the configuration that the light emitted from the portion close to the non-emitting portion is higher in intensity (greater in amount) than the light emitted from the other portion, the illuminating device of the present invention is capable of preventing or minimizing reduction in intensity (reduction in amount) of the light resulting from the existence of the non-emitting portion.

If the light emitted from the portion other than the non-emitting portion is uniform in intensity, the light that enters the inside of the light guide member from a portion of the light guide member, the portion opposing the non-emitting portion, is lower in intensity than the light that enters from the other portion because no light-emitting element is disposed on the non-emitting portion. However, the illuminating device of the present invention is capable of compensating for the local low intensity (the local decrease in amount) of the light resulting from the existence of the non-emitting portion because the light emitted from the portion close to the non-emitting portion is higher in intensity than the light emitted from the other portion.

In addition, a part of the light that enters the inside of the light guide member from the entrance face sometimes leaks from the entrance face, and the leaked light is reflected by a surface of the light source to reenter the inside of the light guide member from the entrance face. If the light source has the portion of lower reflectivity than the other portion, the light that is reflected by the portion of lower reflectivity to reenter the inside of the light guide member is lower in intensity than the light that is reflected by the other portion of the light source to reenter the inside of the light guide member. However, the illuminating device of the present invention is capable of compensating for the low intensity (the decrease in amount) of the reentering light resulting from the existence of the portion of lower reflectivity because the light emitted from the portion close to the portion of lower reflectivity is higher in intensity than the light emitted from the other portion.

Thus, the illuminating device of the present invention is capable of uniformalizing the intensity of the light that enters the inside of the light guide member from the entrance face of the light guide member. To be specific, the illuminating device of the present invention is capable of minimizing or preventing non-uniformalization of the intensity of the light that enters the inside of the light guide member from the entrance face of the light guide member. It is to be noted that the "intensity of the light that enters the inside of the light guide member from the entrance face of the light guide member" defines the sum intensity of the "light that directly enters therein from light-emitting elements of first to third light sources" and the "light that leaks from the entrance face and then reenters the inside of the light guide member from the entrance face of the light guide member". That is, the illuminating device of the present invention is capable of uniformalizing the sum of the light that enters the inside of the light guide member over the entire light guide member irrespective of whether the light is direct light or indirect light.

DESCRIPTION OF EMBODIMENTS

Detailed descriptions of preferred embodiments of the present invention will now be provided with reference to the accompanying drawings.

An illuminating device 1 of a preferred embodiment is used for a light source of a display device that includes a transmissive or transflective display panel such as a liquid crystal display device. The illuminating device 1 of the present embodiment defines a side light type illuminating device, which is referred to also as a "side light type backlight unit" or an "edge light type backlight unit".

Figure 1:
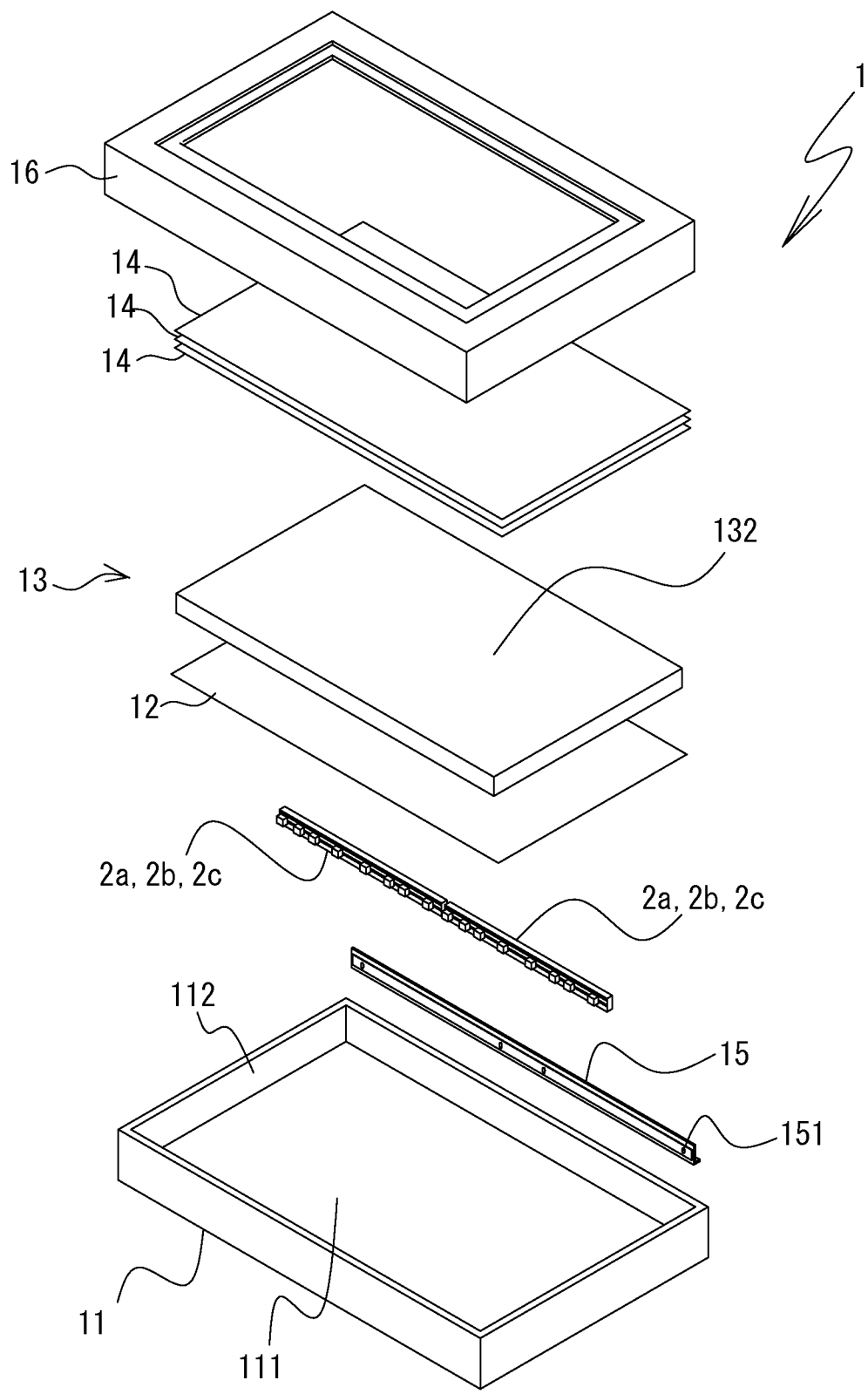
FIG. 1 is an exploded perspective view showing a schematic configuration of an illuminating device of a preferred embodiment of the present invention, where a light source is disposed on one side of a light guide member.

FIG. 1 is an exploded perspective view showing a schematic configuration of a relevant part of the illuminating device 1 of the present embodiment. The top of FIG. 1 is referred to as a front face side of the illuminating device 1, and the bottom of FIG. 1 is referred to as a back face side of the illuminating device 1 for the sake of illustration. Same applies to the constituent elements of the illuminating device 1.

The illuminating device 1 of the present embodiment includes light sources $2a$, $2b$, $2c$, a light guide member 13, a chassis 11, a reflection sheet 12, optical sheets 14, a light source holding member 15, and a frame 16 as shown in FIG. 1. The illuminating device 1 of the present embodiment is arranged to guide light emitted from the light sources $2a$, $2b$, $2c$ to enter the light guide member 13 to emit to the outside from a front face of the light guide member 13. It is to be noted that the illuminating device 1 of the present embodiment sometimes includes given members and instruments (e.g., a power board arranged to supply power to the light sources $2a$, $2b$, $2c$) in addition to the constituent elements described above, which are not illustrated nor explained. In the configuration shown in FIG. 1, the light sources $2a$, $2b$, $2c$ are disposed on one side of the light guide member 13.

The light sources $2a$, $2b$, $2c$ used in the illuminating device 1 of the present embodiment define linear light sources that are capable of emitting liner light. The illuminating device 1 of the present embodiment includes any one of the three types of light sources $2a$, $2b$, $2c$. The three types of light sources $2a$, light sources $2b$, and light sources $2c$ are referred to as first light sources $2a$, second light sources $2b$, and third light sources $2c$, respectively, for the sake of illustration.

Detailed descriptions of the unique configurations of the first to third light sources $2a$, $2b$, $2c$ will be provided later. Detailed descriptions of the common configurations of the first to third light sources $2a$, $2b$, $2c$ will be now provided. Each of the first to third light sources $2a$, $2b$, $2c$ includes a plurality of light-emitting elements 21, 211, 222, and a long and narrow strip-shaped board 22. The plurality of light-emitting elements 21, 211, 222 are mounted on each board 22 while disposed in series in a longitudinal direction of each board 22. Each board 22 includes, on its surface, printed identification characters that show the types of light sources 2a, 2b, 2c (e.g., a one-dimensional code such as a bar-code, a two-dimensional code such as a QR code (a registered trademark), a region where other given characters or descriptions are printed). In addition, each board 22 includes a connector 25 (e.g., a connector to which an electric wire arranged to receive a power supply from the outside is to be connected). In addition, each board 22 includes through-holes 24 through which screws arranged to fix the first to third light sources 2a, 2b, 2c to the light source holding member (described later) pass.

The light guide member 13 defines an optical member arranged to convert the light emitted from the first to third light sources 2a, 2b, 2c (linear light) into planar light, and then emit the light to the outside from the front face thereof. The light guide member 13 is made of a clear plate having a given thickness (a size in the back/forth direction). The shape and size of the light guide member 13 (i.e., the shape and size seen from the front face side or back face side) correspond with the shape and size of a back face of an image display region in a display panel of a display device in which the illuminating device 1 of the present embodiment is included, where the light guide member 13 can project the light onto the entire image display region. Thus, the shape and size of the light guide member 13 are determined in accordance with the shape and size of the display panel of the display device in which the illuminating device 1 of the present embodiment is included (in particular, the shape and size of the image display region in the display panel). For example, the light guide member 13 is made of a quadrangular plate with a given aspect ratio when seen from the front face side or back face side as shown in FIG. 1.

The light guide member 13 includes an entrance face 131 (not seen in FIG. 1 because it is hidden) from which the light emitted from the first to third light sources 2a, 2b, 2c enters, and an emitting face 132 (the upper face shown in FIG. 1) arranged to emit the light to the outside (to the front face side). To be specific, assuming that the light guide member 13 is a "plate" having a given thickness, an end face of a peripheral portion in a plane direction of the plate defines the entrance face 131. When the light guide member 13 is quadrangular when seen from the front face side or back face side, an end face/end faces that correspond(s) to one or more sides of the four sides of the quadrangle define(s) the entrance face/entrance faces 131. That is, an end face/end faces that oppose(s) the light sources 2a, 2b, 2c (or, a portion/portions that oppose(s) the light sources 2a, 2b, 2c) among the end faces of the peripheral portion of the plate define(s) the entrance face/entrance faces 131. In addition, a front side face (one face in a thickness direction) of the light guide member 13 defines the emitting face 132. In other words, the face, which opposes the back face of the display panel when the illuminating device 1 of the present embodiment is incorporated in the display device, defines the emitting face 132.

A back side face of the light guide member 13 (a face opposite to the emitting face 132) has a surface property of easy reflection of light. For example, fine asperities are formed, or a paint that easily reflects light (paint of high reflectivity) is coated on the face.

The chassis 11 defines a housing of the illuminating device 1 of the present embodiment. The chassis 11 is arranged to house the reflection sheet 12, the light guide member 13, the optical sheets 14, the first to third light sources 2a, 2b, 2c, and the light source holding member 15. The chassis 11 has the shape of a dish or tray of low height as shown in FIG. 1. To be specific, the chassis 11 includes a bottom face 111, and a side wall 112 that surrounds the bottom face 111 and protrudes to the front face side. The chassis 11 houses the reflection sheet 12, the light guide member 13, the optical sheets 14, the first to third light sources 2a, 2b, 2c, and the light source holding member 15 in a region surrounded by the side wall 112 on a front face side of the bottom face 111. The chassis 11 is preferably made of a metal plate that is subjected to press working. It is also preferable that the chassis 11 is made of a resin that is subjected to injection molding.

The light source holding member 15 is arranged to fix the first to third light sources 2a, 2b, 2c, to the chassis 11. The light source holding member 15 preferably has a rod-like shape of the letter "L" in cross section as shown in FIG. 1. The first to third light sources 2a, 2b, 2c are fixed to one side of the letter "L" of the light source holding member 15, and the other side of the letter "L" is fixed to the bottom face 111 of the chassis 11, whereby the first to third light sources 2a, 2b, 2c can be fixed to the chassis 11. Thus, the light source holding member 15 includes screw holes 151 in order to fix the first to third light sources 2a, 2b, 2c thereto by screws (not illustrated in FIG. 1).

In addition, it is preferable that the light source holding member 15 has the function of preventing the first to third light sources 2a, 2b, 2c from becoming hot by conducting heat generated by the first to third light sources 2a, 2b, 2c to the chassis 11 (the function of radiating heat). In this case, the light source holding member 15 and the chassis 11 are preferably made from a material having favorable thermal conductivity. For example, the light source holding member 15 and the chassis 11 are made from metal such as aluminum.

It is essential only that the light source holding member 15 has a configuration capable of fixing the first to third light sources 2a, 2b, 2c to the chassis 11, and the configuration is not specifically limited to the configuration shown in FIG. 1. It is also preferable that the first to third light sources 2a, 2b, 2c are fixed directly to the side wall 112 of the chassis 11 without using the light source holding member 15.

The reflection sheet 12 is arranged to reflect to return the light that leaks out of the back face of the light guide member 13. It is preferable that the reflection sheet 12 defines a white sheet made of a resin. For example, a sheet of an expanded PET (polyethylene terephthalate) that is about 0.1 to 2 mm in thickness is used as the reflection sheet 12. Because the reflection sheet 12 reflects to return the light that leaks out of the back face of the light guide member 13, the light can be used effectively (waste of the light can be reduced). The material and thickness of the reflection sheet 12 are not limited specifically.

The optical sheets 14 define optical members having the shape of a plate, sheet or film, which are arranged to adjust the properties of light that passes therethrough. For example, a diffusion plate, a diffusion film (or a diffusion sheet), a lens film (or a lens sheet) and a luminance enhancement sheet are used for the optical sheets 14.

The diffusion plate defines an optical member arranged to randomly diffuse light that passes therethrough, allowing uniformalization of luminance distribution in a plane direction of the light. The diffusion plate is made from a clear material that defines a base material, in which fine particles having a surface property of reflecting light, or fine particles made of a material having a refractive index different from the base material are mixed.

The diffusion film (or diffusion sheet) defines an optical member that allows uniformalization of intensity distribution in a plane direction of light that passes therethrough. The diffusion film (or diffusion sheet) is made from a clear base material, in which fine particles having a surface property of reflecting light, or fine particles made of a material having a refractive index different from the base material are mixed, and formed into a film or sheet shape. The lens film (or lens sheet) defines an optical member arranged to gather light that passes therethrough, allowing enhancement of luminance of the light. The lens film (or lens sheet) has a layer structure made up of a clear base layer, and a layer of a given cross-sectional shape that has a light-gathering function. The base layer is preferably made from a resin such as PET. The layer having the light-gathering function is preferably made from an acrylic resin. The luminance enhancement film defines an optical member arranged to effectively use the light the light sources emit, allowing enhancement of luminance of the image screen displayed by a display panel of a display device 5 of a preferred embodiment of the present invention (to be described later). The luminance enhancement film is capable of transmitting the light having a polarization axis in a given direction and reflecting the other light. The luminance enhancement film is preferably a DBEF film (DBEF is a registered trademark of 3M COMPANY).

The optical sheets 14 of given kinds and given number are stacked in a given order. The number and the kinds of the optical sheets 14 included in the illuminating device 1 of the present embodiment are not limited specifically. The number and the kinds of the optical sheets 14 are determined appropriately in accordance with the kind of the illuminating device 1 of the present embodiment, or the kind of the display device in which the illuminating device 1 of the present embodiment is included (i.e., the display device 5 of the preferred embodiment of the present invention).

The frame 16 defines, together with the chassis 11, a portion of the housing of the illuminating device 1 of the present embodiment. The frame 16 is arranged to hold the reflection sheet 12, the light guide member 13 and the optical sheets 14 in the chassis 11 (i.e., arranged to keep them not to fall from the chassis 11). The frame 16 has a frame shape with an opening capable of transmitting light. The frame 16 is preferably made of a metal plate that is subjected to press working. It is also preferable that the frame 16 is made of a resin that is subjected to injection molding. The size and shape of the frame 16 (in particular, the size and shape of the opening) are determined appropriately in accordance with the specifications of the illuminating device 1 of the present embodiment (e.g., the size of a screen of a display device in which the illuminating device 1 of the present embodiment is included). Thus, the configuration of the frame 16 is not limited specifically.

Next, a description of assembly of the illuminating device 1 of the present embodiment will be provided with reference to FIG. 1.

The light source holding member 15 is fixed to the bottom face 111 of the chassis 11. Any one of the first light sources 2a, the second light sources 2b, and the third light sources 2c are fixed to the light source holding member 15. As described above, the first to third light sources 2a, 2b, 2c are fixed to the light source holding member 15 by the screws (not illustrated in FIG. 1). Thus, the heads of the screws are exposed on the surfaces of the boards 22 of the first to third light sources 2a, 2b, 2c (i.e., faces of the boards 22 that oppose the entrance face of the light guide member 13).

Then, the reflection sheet 12 is placed on the bottom face 111 of the chassis 11, and the light guide member 13 is further placed on the front face of the reflection sheet 12. Thus, the entrance face 131 of the light guide member 13 opposes given faces of the first to third light sources 2a, 2b, 2c (the faces on which the light-emitting elements 21, 211, 222 are mounted).

Further, the optical sheets 14 are placed on the front face of the light guide member 13, and the frame 16 is attached to the chassis 11 from the front face side of the optical sheets 14. When the frame 16 is attached to the chassis 11, the reflection sheet 12, the light guide member 13 and the optical sheets 14 are kept being housed in the chassis 11.

A power board (e.g., a circuit board that incorporates a power supply circuit) arranged to supply power to the first to third light sources 2a, 2b, 2c, may be provided on the back face side of the illuminating device 1 of the present embodiment (on the back face side of the bottom face 111 of the chassis 11). Further, other constituent elements may be included in the chassis 11. These constituent elements are not explained or illustrated.

In FIG. 1, the illuminating device 1 of the present embodiment has the configuration of including the quadrangular light guide member 13, where the face on one side of the four sides of the light guide member 13 defines the entrance face 131, and the first to third light sources 2a, 2b, 2c are disposed opposing the entrance face 131. However, the illuminating device 1 of the present embodiment is not limited to the configuration shown in FIG. 1.

Figure 2:
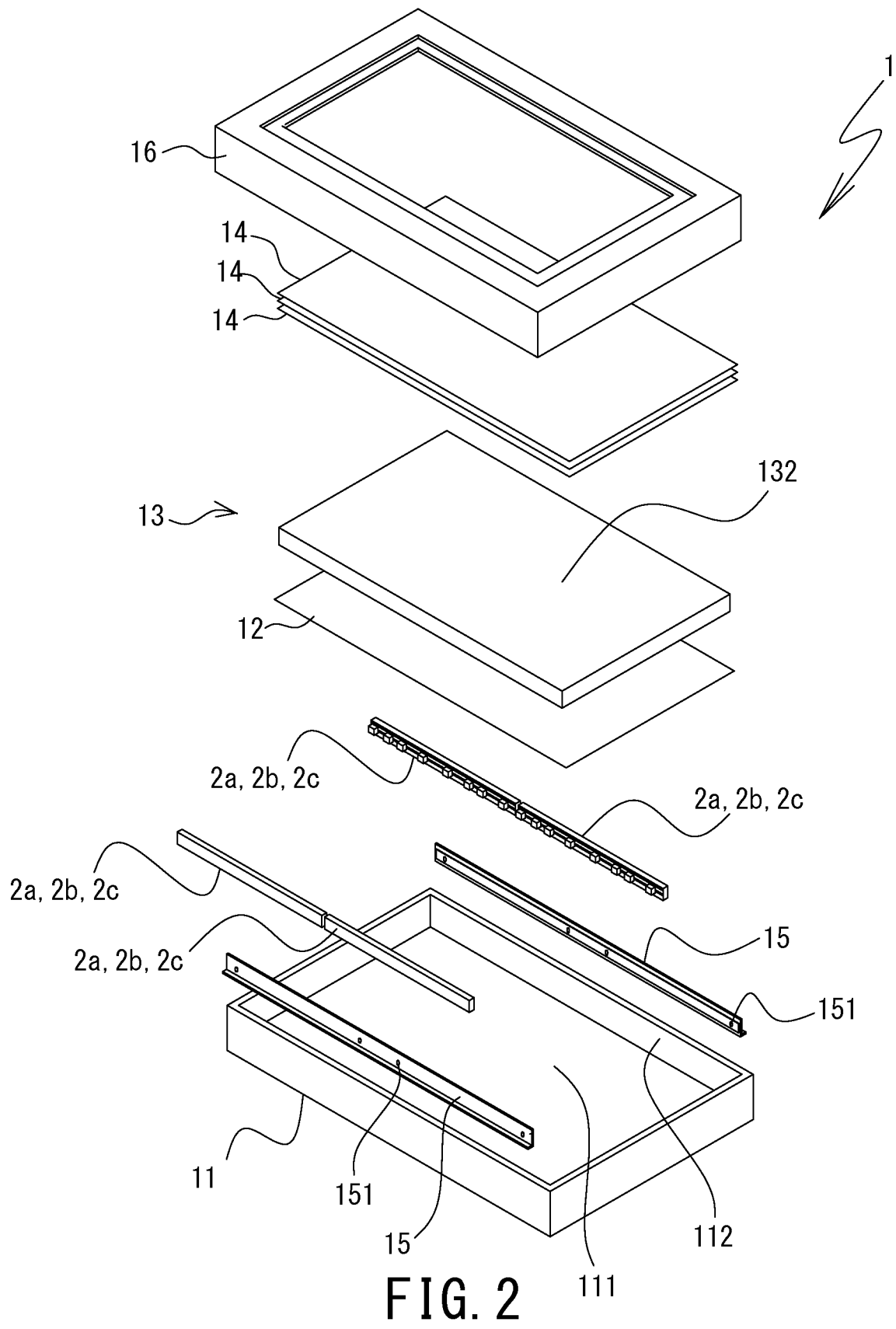
FIG. 2 is an exploded perspective view showing a schematic configuration of an illuminating device of a preferred embodiment of the present invention, where light sources are disposed on two opposing sides of a light guide member.
Figure 3:
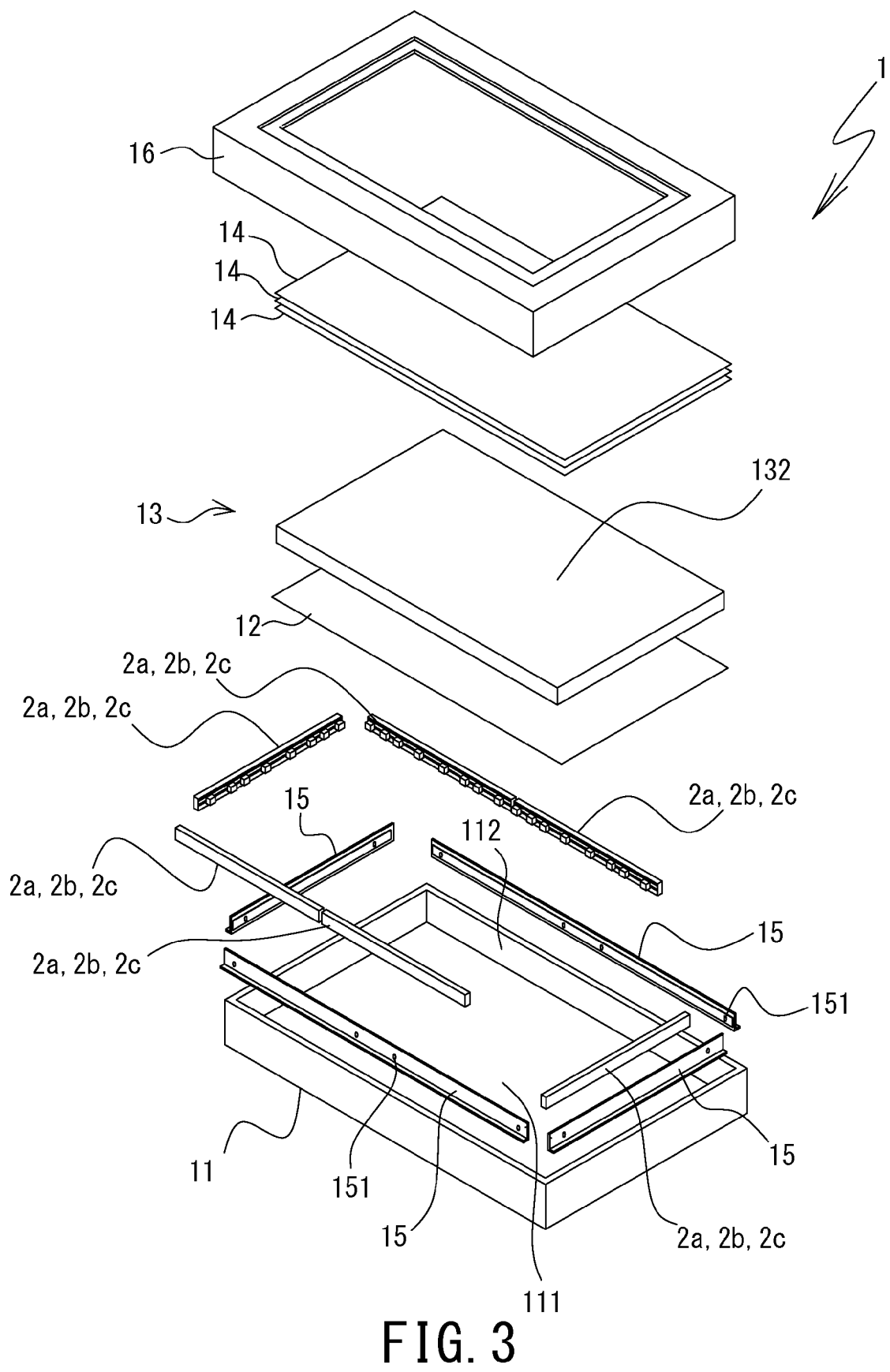
FIG. 3 is an exploded perspective view showing a schematic configuration of an illuminating device of a preferred embodiment of the present invention, where light sources are disposed on all the sides of a light guide member.

FIG. 2 is an exploded perspective view showing a schematic configuration of the illuminating device 1 of the present embodiment, where the first to third light sources 2a, 2b, 2c are disposed on one side of the light guide member 13. FIG. 3 is an exploded perspective view showing a schematic configuration of the illuminating device 1 of the present embodiment, where the first to third light sources 2a, 2b, 2c are disposed on all the sides of the light guide member 13. In FIGS. 2 and 3, cooling mechanisms 26 (to be described later) are not illustrated. For example, it is also preferable that the illuminating device 1 of the present embodiment has a configuration that the faces on opposing two sides of the four sides define the entrance faces 131, and the first to third light sources 2a, 2b, 2c are provided so as to oppose each of the two entrance faces 131 as shown in FIG. 2. To be specific, the first to third light sources 2a, 2b, 2c oppose each other while sandwiching the light guide member 13. In addition, it is also preferable that the illuminating device 1 of the present embodiment has a configuration of including the quadrangular light guide member 13, where the faces on all the four sides (four faces) of the light guide member 13 define the entrance faces 131, and the first to third light sources 2a, 2b, 2c are provided so as to oppose each of these entrance faces 131 as shown in FIG. 3. To be specific, the first to third light sources 2a, 2b, 2c are disposed so as to surround the light guide member 13.

In addition, shown in FIGS. 1 to 3 is the illuminating device 1 of the present embodiment having the configuration that one or two first light sources 2a, one or two second light sources 2b, or one or two third light sources 2c are disposed on one entrance face 131 of the light guide member 13 (i.e., a face corresponding to a side of the four sides of the quadrangle); however, the present invention is not limited to this configuration. For example, it is also preferable that one first light source 2a, one second light source 2b, or one third light source 2c is disposed on one entrance face 131 of the light guide member 13. It is also preferable that three or more first light sources 2a, three or more second light sources 2b, or three or more third light sources 2c are disposed on one entrance face 131 of the light guide member 13.

As described above, the number and the position of entrance face/entrance faces 131 of the light guide member 13, and the number of the first to third light sources 2a, 2b, 2c are not limited specifically. The number and the position of entrance face/entrance faces 131 provided to the light guide member 13, and the number of the first light sources 2a, the second light sources 2b, or the third light sources 2c that oppose one entrance face 131 are determined appropriately in accordance with the specifications of the first to third light sources 2a, 2b, 2c.

Next, configurations of the first light sources 2a, the second light sources 2b, and the third light sources 2c are described one by one.

Figure 4:
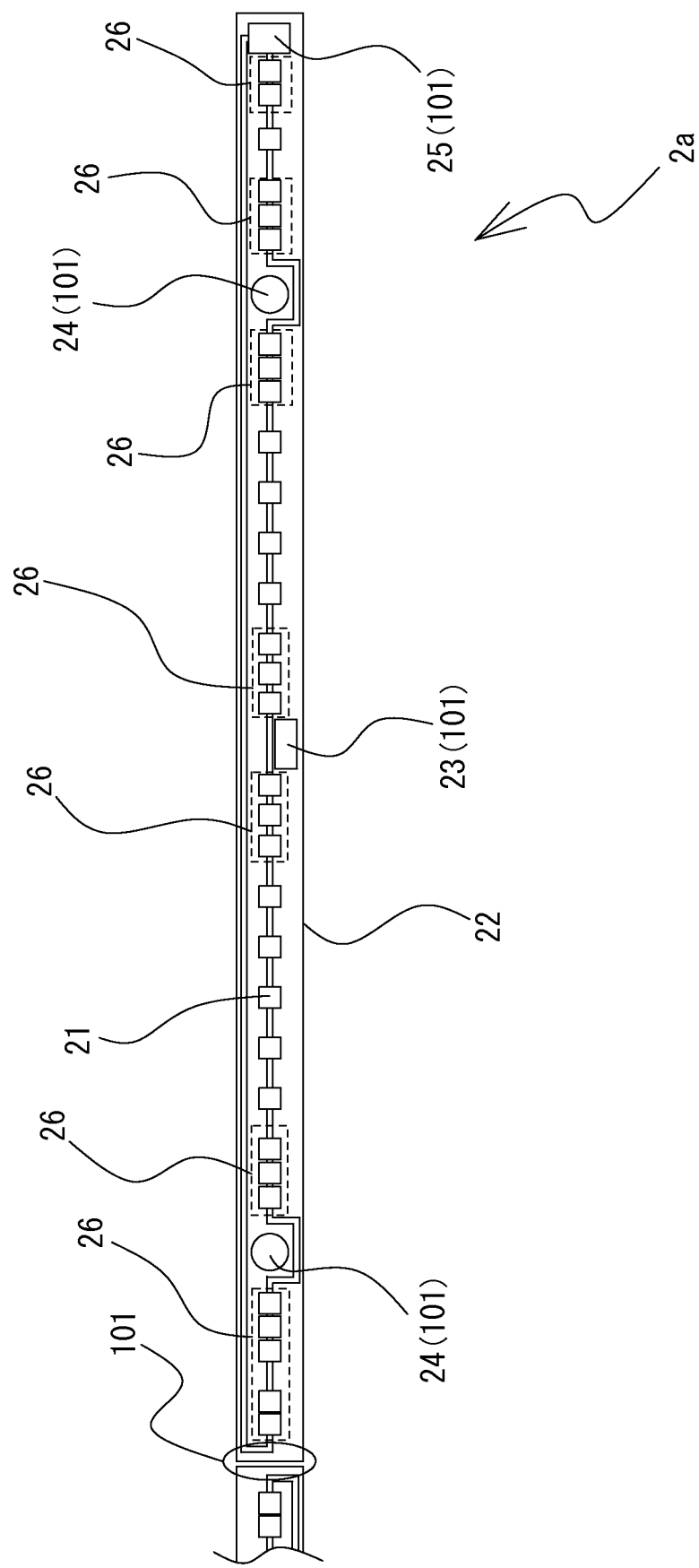
FIG. 4 is a plan view showing a schematic configuration of first light sources of the present invention, where the light sources are disposed on all the sides of the light guide member.

FIG. 4 is a plan view showing a schematic configuration of the first light sources 2a. In the illuminating device 1 of the present embodiment, two first light sources 2a are disposed on one side of the four sides of the light guide member 13. In other words, a pair of two first light sources 2a oppose one entrance face 131 of the light guide member 13.

Each board 22 has a long and narrow strip shape as shown in FIG. 4. The size in a width direction of the board 22 (i.e., the size in the back/forth direction with reference to the illuminating device 1 of the present embodiment) is determined so as to be housed in the chassis 11. The size in a longitudinal direction of each board 22 is determined in accordance with the size of the entrance face 131 of the light guide member 13. When two first light sources 2a are disposed on one entrance face 131 of the light guide member 13 (see FIG. 1), the size in the longitudinal direction of each board 22 is determined to be about half the size of the entrance face 131 of the light guide member 13. It is essential only that each board 22 should have the size and shape so as to be able to project light onto the entire entrance face 131 of the light guide member 13 (a portion of the light guide member 13 that corresponds to given one side of the four sides of the light guide member 13 when the light guide member 13 is quadrangular when seen from the front face side or back face side).

The light-emitting elements 21 are mounted on each board 22 while disposed in series in the longitudinal direction of each board 22. The light-emitting elements 21 on each board 22 are electrically connected to a wiring pattern provided on each board 22. An electrical connection between the light-emitting elements 21 by the wiring pattern is not limited specifically. For example, it is preferable that all of the light-emitting elements are electrically connected in series by the wiring pattern. It is also preferable that the light-emitting elements 21 are divided into two groups, and the light-emitting elements 21 in one of the groups are electrically connected in series while the light-emitting elements 21 in the other group are electrically connected in series, and the groups are electrically connected in parallel.

Examples of the configuration of each light-emitting element 21 include 1) a configuration of including an LED package as a light-emitting element, which includes a blue light-emitting LED element coated with a fluorescent material that has an emission peak wavelength in a yellow region so as to emit white light, 2) a configuration of including an LED package as a light-emitting element, which includes a blue light-emitting LED element coated with a fluorescent material that has an emission peak wavelength in a green region and a red region so as to emit white light, 3) a configuration of including an LED package as a light-emitting element, which includes a blue light-emitting LED element coated with a fluorescent material that has an emission peak wavelength in a green region, and a red light-emitting LED element so as to emit white light, 4) a configuration of including an ultraviolet-emitting element, and a fluorescent material arranged to receive ultraviolet light emitted from the ultraviolet-emitting element to be pumped to emit visible light, 5) a configuration of including an ultraviolet-emitting element, a fluorescent material arranged to receive ultraviolet light emitted from the ultraviolet-emitting element to be pumped to emit red light, a fluorescent material arranged to receive ultraviolet light emitted from the ultraviolet-emitting element to be pumped to emit green light, and a fluorescent material arranged to receive ultraviolet light emitted from the ultraviolet-emitting element to be pumped to emit blue light so as to emit white light by combining the red light, green light and blue light, and 6) a configuration of including an LED package arranged to emit red light, an LED package arranged to emit green light, and an LED package arranged to emit blue light so as to emit white light.

It is essential only that the light-emitting elements 21 should have the configuration capable of emitting white light, or should have a configuration capable of emitting white light by being combined appropriately so as to emit white light as described above. The configuration of each light-emitting element 21 is not limited specifically, and light-emitting elements of various kinds that are capable of emitting white light are preferably used as the light-emitting element 21.

Each board 22 includes portions where the light-emitting elements 21 are not mounted. Each board 22 includes, on its surface, printed identification characters 23 (e.g., identifying codes) that show the types of first light sources 2a. Examples of the printed identification characters 23 include a one-dimensional code such as a bar-code, a two-dimensional code such as a QR code (a registered trademark). A sticker on which given characters and numbers are written can be used for the printed identification characters 23. In addition to the printed identification characters 23, each board 22 includes the through-holes 24 through which the screws arranged to fix the first light sources 2a to the light source holding member 15 pass. Further, each board 22 includes the connector 25. Examples of the connector 25 include a connector to which an electric wire arrange to receive a power supply from the outside is to be connected. In addition, each board 22 includes the through-holes 24 through which the screws arranged to fix the first to third light sources 2a, 2b, 2c to the light source holding member 15 (described later) pass. Thus, the light-emitting elements 21 are not disposed on a portion where the printed identification characters 23 are provided, a portion where the through-holes 24 are provided, and a portion where the connector 25 is provided. Further, in the configuration where the two first light sources 2a are disposed side by side, the light-emitting elements 21 are not disposed in the space between the boards 22.

Hereinafter, the "portions where the light-emitting elements 21 are not mounted" are referred to as "non-emitting portions 101". To be specific, in the illuminating device 1 of the present embodiment, the portions where the printed identification characters 23 are provided, the portions where the through-holes 24 are provided (i.e., this portions become the "portions where the heads of the screws are exposed" when the first light sources 2a are fixed to the light source holding member 15), the portions where the connectors 25 are provided, and the space between the boards 22 correspond to the "non-emitting portions 101". However, the "non-emitting portions 101" are not limited to these portions. Any portions where the light-emitting elements 21 are not mounted (i.e., any portions where the light-emitting elements 21 cannot be mounted) define "non-emitting portions 101".

In addition, the non-emitting portions 101 define "portions of lower reflectivity", which have a lower reflectivity than the other portions.

A film made from a material having a given reflectivity is formed on the surface of each board 22. For example, a film of resist is formed thereon. Thus, the surface of each board 22 has a given reflectivity. In contrast, the printed identification characters 23 and the connector 25 have lower reflectivities than the film made of the material described above. In addition, because the first light sources 2a are fixed to the light source holding member 15 by the screws, the screws are fitted into the through-holes 24 of the boards 22 when the first light sources 2a are incorporated in the illuminating device 1 of the present embodiment, so that the heads of the screws exist (are exposed) on the surfaces of the boards 22. The heads of the screws have a lower reflectivity than the film made of the material described above. In addition, in the configuration where the two first light sources 2a are disposed side by side, the space between the boards 22 of the two first light sources 2a has a lower reflectivity than the surfaces of the boards 22.

Thus, the non-emitting portions 101 define "portions of lower reflectivity", which have a lower reflectivity than the other portions.

The spaces between a given number of light-emitting elements 21 close to each non-emitting portion 101 (i.e., each portion of lower reflectivity) (in the present embodiment, the spaces define the spaces between a given number of light-emitting elements 21 that are disposed on one side of each non-emitting portion 101 in the longitudinal direction of each board 22, and the spaces between a given number of light-emitting elements 21 that are disposed on the other side, while not defining the space between two light-emitting elements 21 that straddle each non-emitting portion 101) are smaller than the spaces between the light-emitting elements 21 disposed on the other portions (e.g., an intermediate position between two non-emitting portions 101).

To be specific, as shown in FIG. 4, the spaces between a given number of light-emitting elements 21 (three light-emitting elements 21 in FIG. 4) close to each printed identification character 23, the space between a given number of light-emitting elements 21 (two light-emitting elements 21 in FIG. 4) close to each connector 25, and the spaces between a given number of light-emitting elements 21 (three light-emitting elements 21 in FIG. 4) close to each through-hole 24 are smaller than the spaces between the light-emitting elements 21 disposed on the other portions. Further, in the configuration where the two first light sources 2a are disposed side by side, the space between a given number of light-emitting elements 21 (two light-emitting elements 21 in FIG. 4) close to each of the adjacent end portions of the two first light sources 2a is smaller than the spaces between the light-emitting elements 21 disposed on the other portions.

The number of light-emitting elements 21 disposed having smaller spaces therebetween is not limited specifically. It is preferable that the spaces between two or three light-emitting elements 21 are smaller than the spaces between the other light-emitting elements 21 as shown in FIG. 4. It is also preferable that the spaces between four or more light-emitting elements 21 are smaller than the spaces between the other light-emitting elements 21.

Then, the cooling mechanisms 26 are disposed on the back faces (the faces opposite to the faces where the light-emitting elements 21 are mounted) of the portions where the spaces between the light-emitting elements 21 are smaller. Peltier devices are preferably used for the cooling mechanisms 26. It is also preferable to provide heat pipes as cooling mechanisms, by which the back faces of the portions where the spaces between the light-emitting elements 21 are smaller are connected to the outside of the chassis 11 to transfer heat there. It is also preferable to provide air-cooling fans as cooling mechanisms.

The first light sources 2a having the configuration described above are capable of making the light emitted from the portions close to the non-emitting portions 101 more intensive (in other words, capable of increasing the amount of the light) than the light emitted from the other portions. In addition, the first light sources 2a are capable of cooling the light-emitting elements 21 disposed at smaller intervals to prevent them from being overheated.

Figure 5:
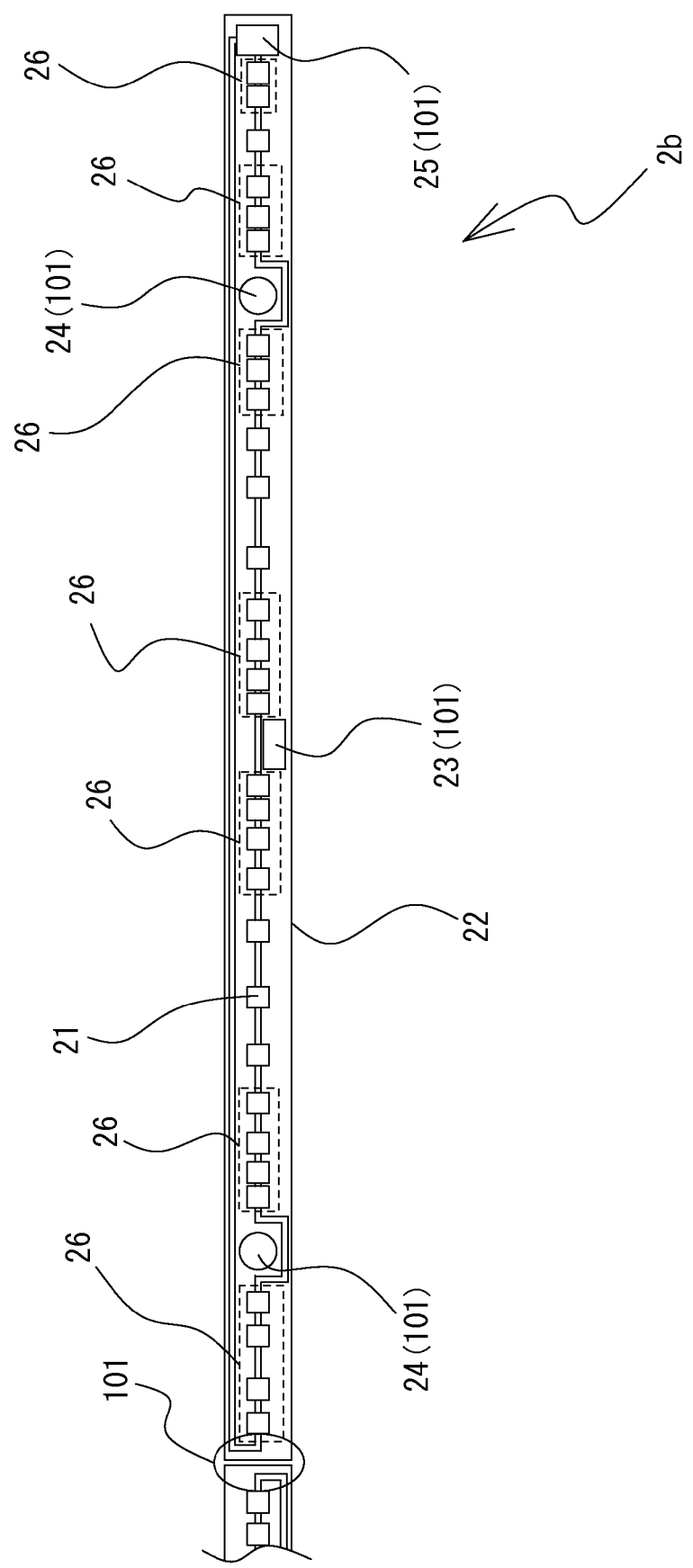
FIG. 5 is a plan view showing a schematic configuration of second light sources of the present invention.

FIG. 5 is a plan view showing a schematic configuration of the second light sources 2b. In the illuminating device 1 of the present embodiment, two second light sources 2b are disposed on one side of the four sides of the light guide member 13 in the same manner as the first light sources 2a. The same configuration as the first light sources 2a can be applied to the second light sources 2b except the disposition of light-emitting elements 21, so that a description of a configuration of the second light sources 2b different from the first light sources 2a is provided while a description of a common configuration is not provided.

The plurality of light-emitting elements 21 are disposed on a surface of each board 22 except for on non-emitting portions 101 (i.e., portions of lower reflectivity) as shown in FIG. 5. The spaces between the light-emitting elements 21 get smaller as the light-emitting elements 21 get closer to the non-emitting portions 101. To be specific, the spaces between the light-emitting elements 21 become largest at intermediate positions between the non-emitting portions 101, and become smallest at positions closest to the non-emitting portions 101.

Cooling mechanisms 26 are disposed on the back faces (the faces opposite to the faces where the light-emitting elements 21 are mounted) of the portions where the spaces between the light-emitting elements 21 get smaller.

The second light sources 2b having the configuration described above are capable of making the light emitted from the portions close to the non-emitting portions 101 (i.e., the portions of lower reflectivity) more intensive (in other words, capable of increasing the amount of the light) than the light emitted from the other portions. In addition, the second light sources 2b are capable of cooling the light-emitting elements 21 disposed having spaces getting smaller to prevent them from being overheated.

Figure 6:
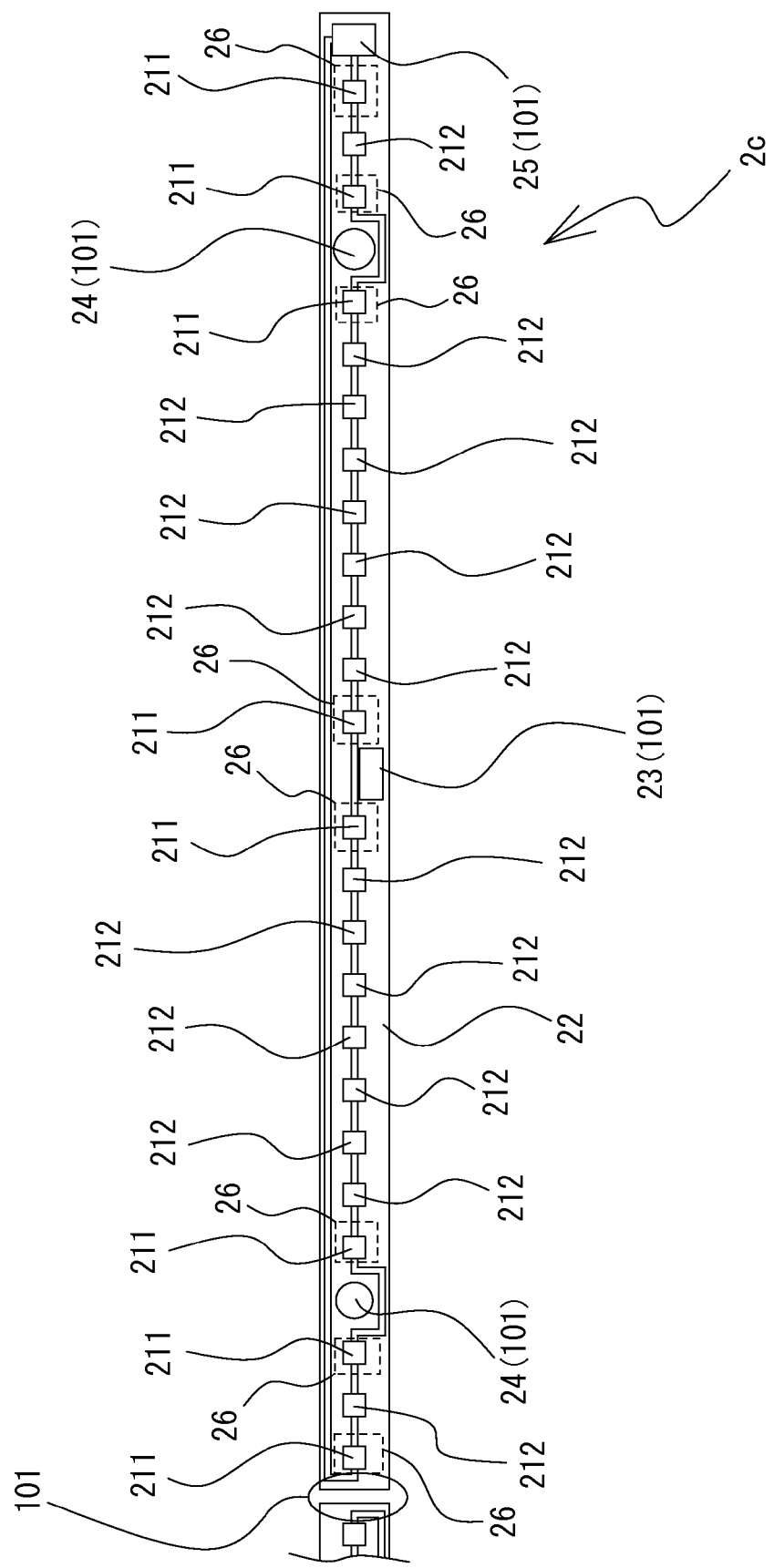
FIG. 6 is a plan view showing a schematic configuration of third light sources of the present invention.

FIG. 6 is a plan view showing a schematic configuration of the third light sources 2c. In the illuminating device 1 of the present embodiment, two third light sources 2c are disposed on one side of the four sides of the light guide member 13 in the same manner as the first light sources 2a and the second light sources 2b. The same configuration as the first light sources 2a can be applied to the third light sources 2c except the kinds of light-emitting elements 211, 212 and the disposition of light-emitting elements 211, 212, so that a description of a configuration of the third light sources 2c different from the first light sources 2a is provided while a description of a common configuration is not provided.

The plurality of light-emitting elements 211, 212 are disposed on the third light sources 2c except for on non-emitting portions 101 (i.e., portions of lower reflectivity) as shown in FIG. 6. The spaces between the light-emitting elements 211, 212 are not limited specifically. For example, the spaces between the light-emitting elements 211, 212 are equal except the spaces between the light-emitting elements 211, 212 that straddle the non-emitting portions 101.

The third light sources 2c include two kinds of light-emitting elements 211, 212 arranged to emit different kinds of light that are different in intensity. The light-emitting elements 211 arranged to emit light relatively high in intensity are referred to as "high-intensity light-emitting elements 211", and the light-emitting elements 212 arranged to emit light low in intensity are referred to as "low-intensity light-emitting elements 212" for the sake of illustration.

Then, the high-intensity light-emitting elements 211 are used for one or some light-emitting elements disposed close to each non-emitting portion 101, and the low-intensity light-emitting elements 212 are used for the light-emitting elements on the other portions. Shown in FIG. 4 is a configuration that the high-intensity light-emitting element 211 is used for one light-emitting element disposed closest to each non-emitting portion 101, and the low-intensity light-emitting elements 212 are used for the other light-emitting elements. It is also preferable that the high-intensity light-emitting elements 211 are used for two or more light-emitting elements disposed close to each non-emitting portion 101.

Cooling mechanisms 26 are disposed on the back faces (the faces opposite to the faces where the light-emitting elements are mounted) of the portions where the high-intensity light-emitting elements 211 are disposed.

LED packages having the following configuration can be used for the high-intensity light-emitting elements 211 and the low-intensity light-emitting elements 212.

(1) A configuration that an LED chip included in an LED package of each high-intensity light-emitting element 211 is arranged to emit light higher in intensity than an LED chip included in an LED package of each low-intensity light-emitting element 212 when electric currents of a same value are applied to the high-intensity light-emitting elements 211 and the low-intensity light-emitting elements 212. In other words, a configuration that an LED chip included in an LED package of each high-intensity light-emitting element 211 is arranged to emit light different in intensity from an LED chip included in an LED package of each low-intensity light-emitting element 212 when electric currents of a same value are applied to the high-intensity light-emitting elements 211 and the low-intensity light-emitting elements 212.

(2) A configuration that that the number of LED chips included in an LED package of each high-intensity light-emitting element 211 is different from the number of LED chips included in an LED package of each low-intensity light-emitting element 212. In other words, a configuration that that the number of LED chips included in an LED package of each high-intensity light-emitting element 211 is larger than the number of LED chips included in an LED package of each low-intensity light-emitting element 212. For example, a configuration that that two LED chips are included in an LED package of each high-intensity light-emitting element 211 while one LED chip is included in an LED package of each low-intensity light-emitting element 212. It is essential only that the number of LED chips included in an LED package of each high-intensity light-emitting element 211 should be larger than the number of LED chips included in an LED package of each low-intensity light-emitting element 212, and the numbers are not limited specifically.

The third light sources 2c having the configuration described above are capable of passing an electric current of one value to the group of high-intensity light-emitting elements 211 and low-intensity light-emitting element 212 that are electrically connected in series to each other. With this configuration, the "high-intensity light-emitting elements 211" among light-emitting elements 211, 212 are capable of emitting light higher in intensity than the "low-intensity light-emitting elements 212".

Thus, the third light sources 2c having the configuration described above are capable of making the light emitted from the portions close to the non-emitting portions 101 more intensive (in other words, capable of increasing the amount of the light) than the light emitted from the other portions. In addition, the third light sources 2c are capable of cooling the high-intensity light-emitting elements 211 to prevent them from being overheated.

Described above are the first to third light sources 2a, 2b, 2c having the configurations that the non-emitting portions 101 define also portions of lower reflectivity; however, it is also preferable that the first to third light sources 2a, 2b, 2c have configurations that the non-emitting portions 101 do not define portions of lower reflectivity.

As described above, the "non-emitting portions 101" define the "portions on which the light-emitting elements 21 are not disposed". Thus, by appropriately setting the sizes and shapes of the printed identification characters 23, the through-holes 24 through which the screws pass, and the connectors 25 (by decreasing the sizes of them, or setting the sizes and shapes of them so as not to interfere with the light-emitting elements 21, 211, 212), the first to third light sources 2a, 2b, 2c can have a configuration that the light-emitting elements 21, 211, 212 are uniformly spaced over the entire boards 22, and no "non-emitting portions 101" are accordingly provided. However, even in this configuration, when the printed identification characters 23, the through-holes 24 through which the screws pass, and the connectors 25 have lower reflectivities than the other portions of the boards 22, they define "portions of lower reflectivity". Thus, it is also preferable that while "portions of lower reflectivity" are provided, no "non-emitting portions 101" are provided.

In addition, the first to third light sources 2a, 2b, 2c can have a configuration that even when the printed identification characters 23, the through-holes 24 through which the screws pass, and the connectors 25 are disposed on the boards 22 to define the "non-emitting portions 101", the surfaces of these members have reflectivities equal to the other portions of the boards 22. This configuration defines a configuration that the "non-emitting portions 101" are provided while no "portions of lower reflectivity" are provided. For example, films made from a material having a reflectivity same as the resist formed on the boards 22 may be formed (e.g., paints may be coated) on the printed identification characters 23, the through-holes 24 through which the screws pass, and the connectors 25.

Thus, in the first to third light sources 2a, 2b, 2c, the light emitted from the portions close to the non-emitting portions 101 or the portions of lower reflectivity is higher in intensity than the light emitted from the other portions.

In addition, the first to third light sources 2a, 2b, 2c can have a configuration that electric power that is supplied to the light-emitting elements 21, 211 close to the non-emitting portions 101 or the portions of lower reflectivity is higher than electric power that is supplied to the light-emitting elements 21, 212 on the other portions. Because the luminance of LEDs is generally proportional to supplied electric power, when LEDs are used for the light-emitting elements 21, 211, 212, the light emitted from the portions close to the non-emitting portions 101 or the portions of lower reflectivity can be made higher in intensity than the light emitted from the other portions.

In this case, it is preferable that the light-emitting elements 21, 211 close to the non-emitting portions 101 or the portions of lower reflectivity and the light-emitting elements 21, 212 on the other portions are connected in parallel, and electrical resistances of different resistance values are provided to the light-emitting elements 21, 211 close to the non-emitting portions 101 or the portions of lower reflectivity and the light-emitting elements 21, 212 on the other portions. In other words, the resistance value of the electrical resistance provided to the light-emitting elements 21, 211 close to the non-emitting portions 101 or the portions of lower reflectivity is made smaller than the resistance value of the electrical resistance provided to the light-emitting elements 21, 212 on the other portions. Thus, electric power that is supplied to the light-emitting elements 21, 211 close to the non-emitting portions 101 or the portions of lower reflectivity is made higher than electric power that is supplied to the light-emitting elements 21, 212 on the other portions.

The illuminating device 1 of the present embodiment has the following action and effect.

Figure 7:
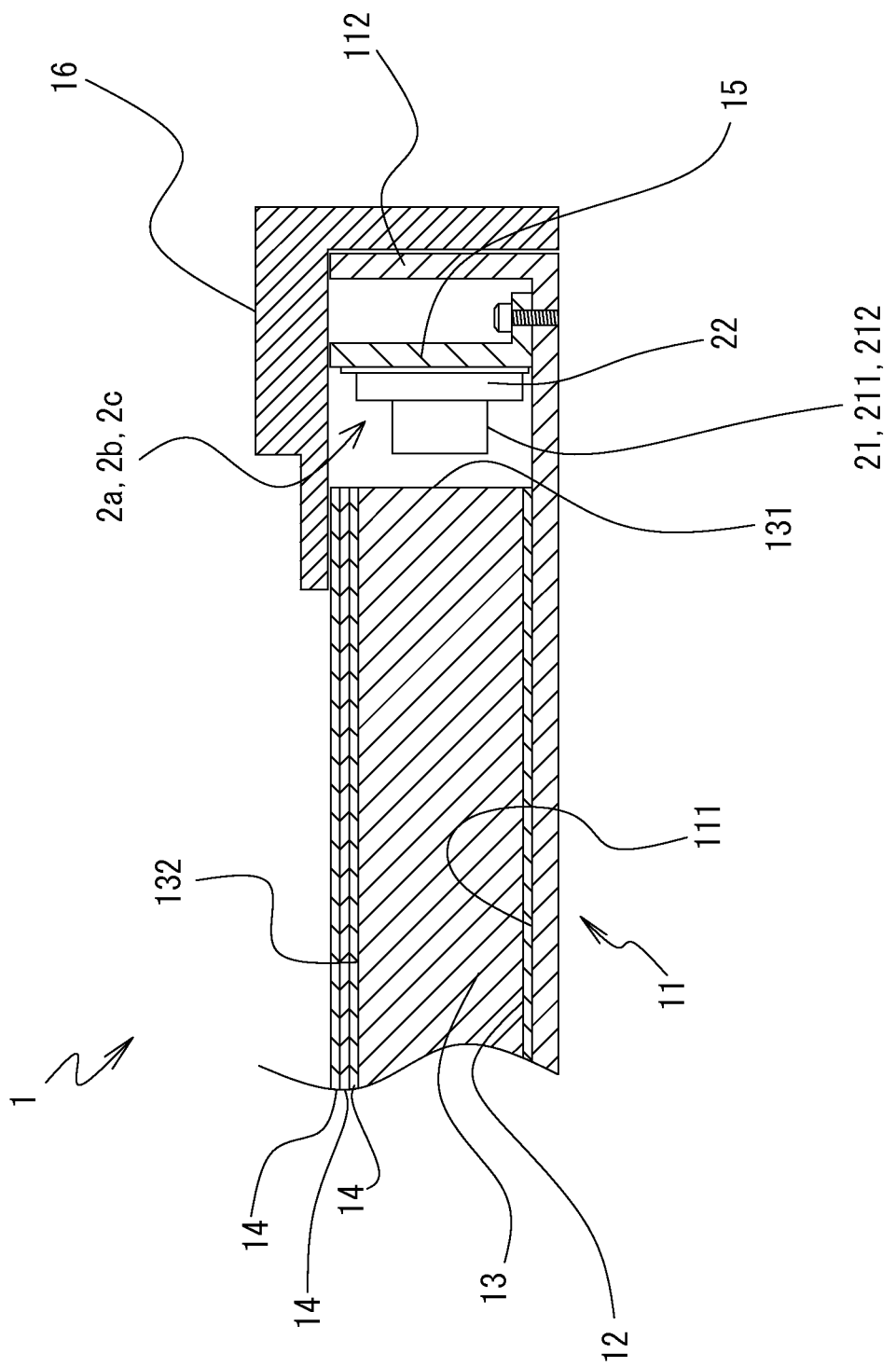
FIG. 7 is a view schematically showing an inner configuration of the illuminating device of the preferred embodiment of the present invention.
Figure 8:
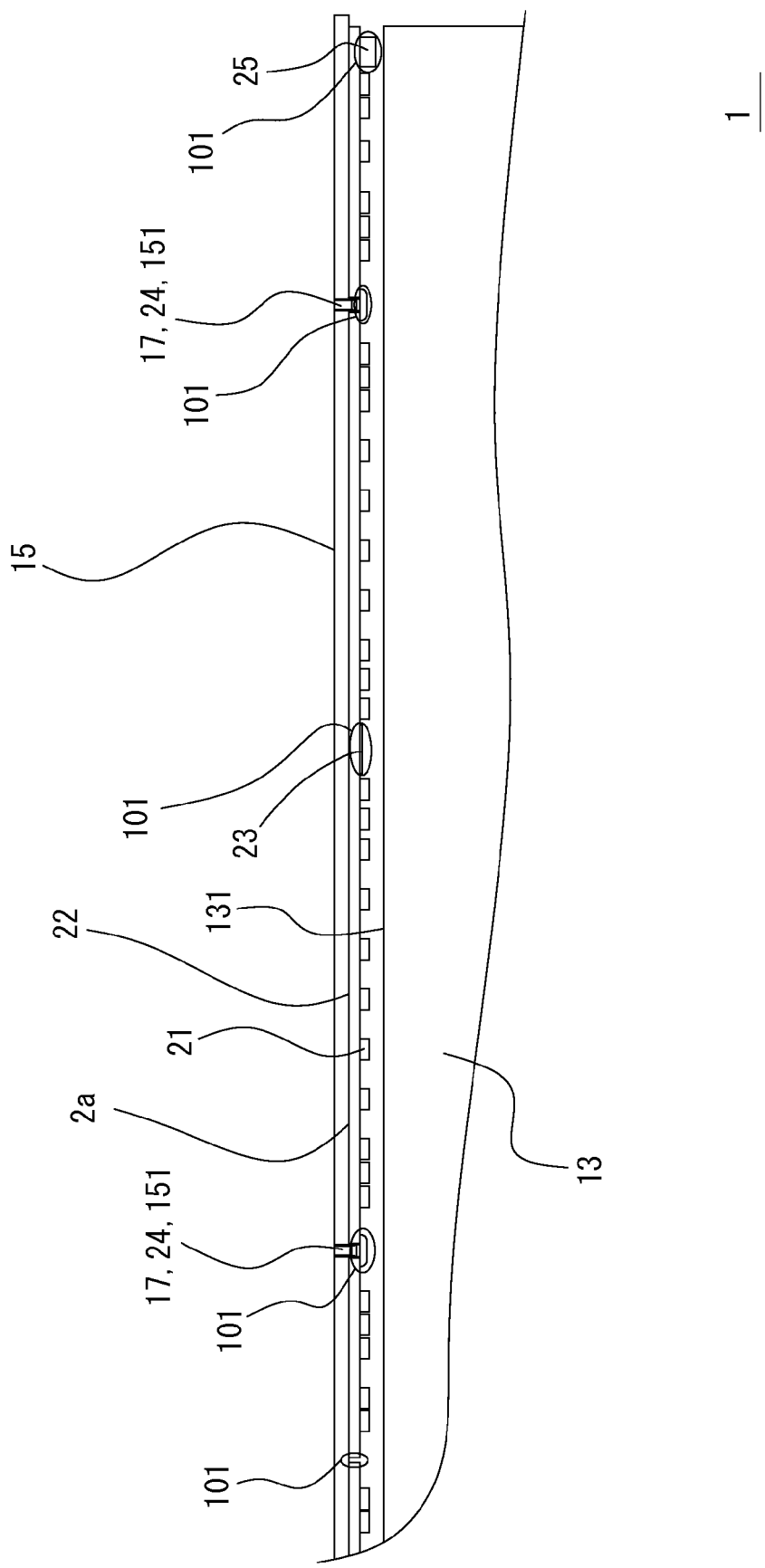
FIG. 8 is a view schematically showing the inner configuration of the illuminating device of the preferred embodiment of the present invention.

FIG. 7 is a view schematically showing an inner configuration of the illuminating device 1 of the present embodiment, which is a cross sectional view showing the illuminating device 1 on a plane of section parallel to the back/forth direction. FIG. 8 is a view schematically showing the inner configuration of the illuminating device 1 of the present embodiment, which is a cross sectional view showing the illuminating device 1 on a plane of section perpendicular to the back/forth direction. FIGS. 7 and 8 especially show a positional relation between the first to third light sources 2a, 2b, 2c and the light guide member 13. Shown in FIG. 8 is the configuration where the first light sources 2a are used. Even when the second or third light sources 2b, 2c are used, a configuration similar to the configuration where the first light sources 2a are used is used.

In the interior of the illuminating device 1 of the present embodiment, given faces of the boards 22 of the first to third light sources 2a, 2b, 2c (faces on which the light-emitting elements 21, 211, 212 are disposed) oppose the entrance face 131 of the light guide member 13 as shown in FIGS. 7 and 8. Thus, the light emitted from the first to third light sources 2a, 2b, 2c (to be exact, the light emitted from the light-emitting elements 21, 211, 212 of the first to third light sources 2a, 2b, 2c) enters the inside of the light guide member 13 from the entrance face 131. The light that has entered the inside of the light guide member 13 travels while being reflected by the back side face of the light guide member 13 or the reflection sheet 12, and is emitted from the emitting face 132 to the outside. In this manner, the illuminating device 1 of the present embodiment is capable of converting the light emitted from the first to third light sources 2a, 2b, 2c that define linear light sources into planar light (i.e., converting the first to third light sources 2a, 2b, 2c into planar light sources). Then, the illuminating device 1 of the present embodiment is capable of projecting the planar light onto the back face of the display panel.

In particular, the printed identification characters 23 and the connectors 25 on the boards 22 of the first to third light sources 2a, 2b, 2c, the heads of the screws 17 arranged to fix the boards 22 of the first to third light sources 2a, 2b, 2c to the light source holding member 15 oppose the entrance face 131 of the light guide member 13 as shown in FIG. 8. In addition, in the configuration where the plurality of first to third light sources 2a, 2b, 2c oppose one entrance face 131 of the light guide member 13, the space between the boards 22 of the first to third light sources 2a, 2b, 2c opposes the entrance face 131 of the light guide member 13. Thus, in the interior of the illuminating device 1 of the present embodiment, the entrance face 131 of the light guide member 13 opposes the non-emitting portions 101 (the portions of lower reflectivity).

In the first to third light sources 2a, 2b, 2c, the light emitted from the portions close to the non-emitting portions 101 is higher in intensity (greater in amount) than the light emitted from the other portions. Thus, the illuminating device 1 of the present embodiment is capable of preventing or minimizing reduction in intensity (reduction in amount) of the light resulting from the existence of the non-emitting portions 101.

To be specific, assuming that intensity distribution in the longitudinal direction of the light emitted from the portions other than the non-emitting portions 101 is uniform, the light that enters the inside of the light guide member 13 from the portions of the entrance face 131, which oppose the non-emitting portions 101, is lower in intensity than the light that enters the inside of the light guide member 13 from the other portions because no light-emitting elements 21, 211, 212 are disposed on the non-emitting portions 101. However, the illuminating device 1 of the present embodiment is capable of compensating for the local low intensity (the local decrease in amount) of the light resulting from the existence of the non-emitting portions 101 because the light emitted from the portions close to the non-emitting portions 101 is higher in intensity than the light emitted from the other portions.

In addition, a part of the light that has entered the inside of the light guide member 13 from the entrance face 131 sometimes leaks from the entrance face 131. Because the entrance face 131 of the light guide member opposes the first to third light sources 2a, 2b, 2c, the light that has leaked from the entrance face 131 of the light guide member 13 is reflected by the surfaces of the boards 22 of the first to third light sources 2a, 2b, 2c, the surfaces of the printed identification characters 23 on the boards 22, the surfaces of the connectors 25 on the boards 22, and the surfaces of the heads of the screws 17 arranged to fix the boards 22, and then reenters the inside of the light guide member 13 from the entrance face 131.

As described above, the films made from the material having the given reflectivity are formed on the surfaces of the boards 22 of the first to third light sources 2a, 2b, 2c. In contrast, the printed identification characters 23 and the connectors 25 on the boards 22, the heads of the screws 17 arranged to fix the boards 22, and the space between the boards 22 of the first to third light sources 2a, 2b, 2c (i.e., the non-emitting portions 101) have lower reflectivities than the surfaces of the boards 22. Thus, the light that has leaked from the entrance face 131 of the light guide member 13 to be reflected by the non-emitting portions 101 to reenter the inside of the light guide member 13 from the entrance face 131 is lower in intensity than the light that has been reflected by the surfaces of the other portions to reenter the inside of the light guide member 13 from the entrance face 131.

For this reason, the light that reenters the inside of the light guide member 13 (the light that has been reflected to reenter the inside of the light guide member 13) from the portions of the entrance face 131, which oppose the non-emitting portions 101, is lower in intensity than the light that reenters the inside of the light guide member 13 from the other portions. However, the illuminating device 1 of the present embodiment is capable of compensating for the low intensity (the decrease in amount) of the reentering light resulting from the existence of the non-emitting portions 101 because the light emitted from the portions close to the non-emitting portions 101 is higher in intensity than the light emitted from the other portions.

Thus, the illuminating device 1 of the present embodiment is capable of uniformalizing the intensity of the light that enters the inside of the light guide member 13 from the entrance face 131 of the light guide member 13. To be specific, the illuminating device 1 of the present embodiment is capable of minimizing or preventing non-uniformalization of the intensity of the light that enters the inside of the light guide member 13 from the entrance face 131 of the light guide member 13. It is to be noted that the "intensity of the light that enters the inside of the light guide member 13 from the entrance face 131 of the light guide member 13" defines the sum intensity of the "light that enters the inside directly from the light-emitting elements 21, 211, 212 of the first to third light sources 2a, 2b, 2c" and the "light that leaks from the entrance face 131 of the light guide member 13 and then reenters the inside of the light guide member 13 from the entrance face 131 of the light guide member 13". That is, the illuminating device 1 of the present embodiment is capable of uniformalizing the sum of the light that enters the inside of the light guide member 13 from the entrance face 131 of the light guide member 13 over the entire entrance face 131 of the light guide member 13 irrespective of whether the light is direct light or indirect light.

Figure 9:
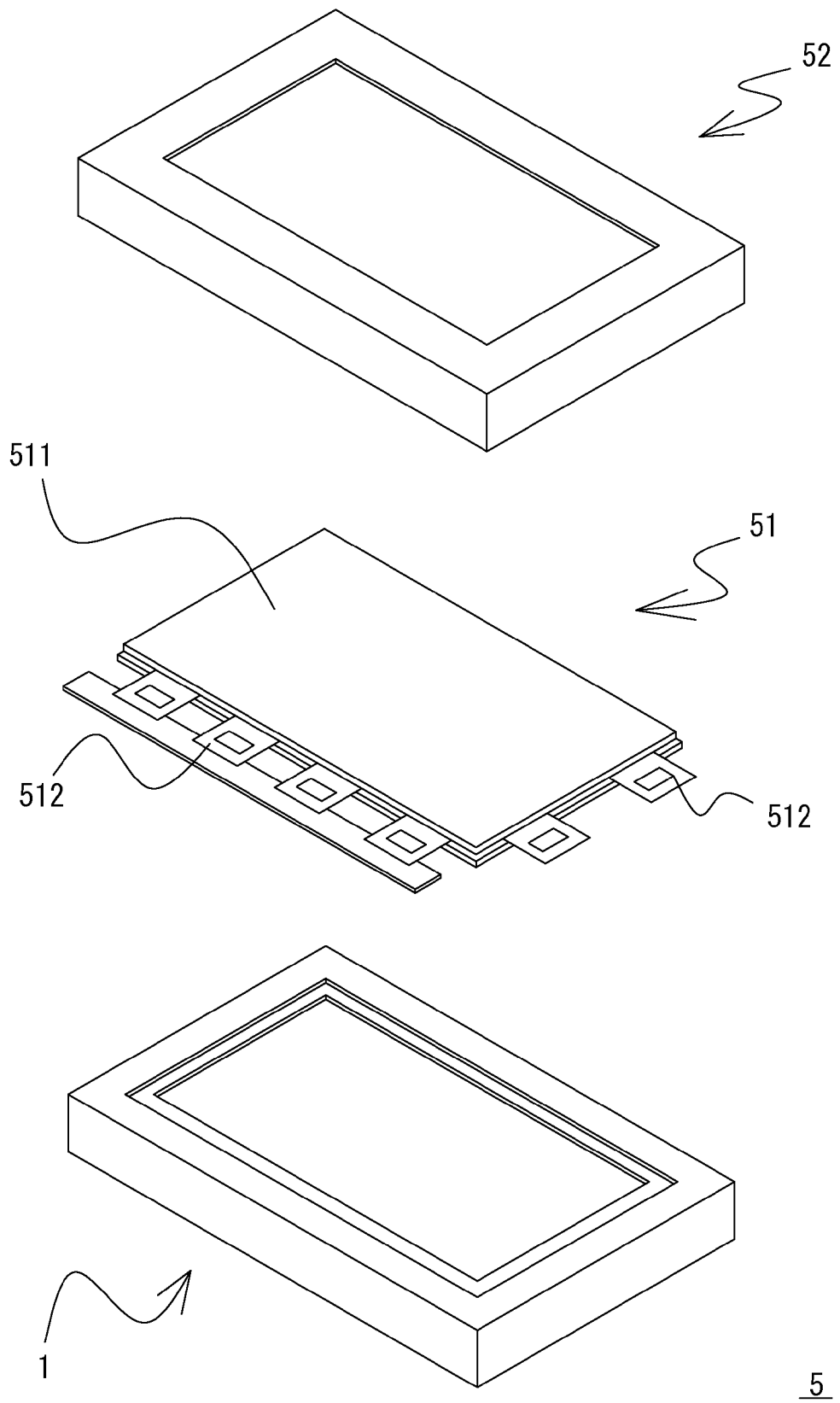
FIG. 9 is an exploded perspective view showing a schematic configuration of a display device of a preferred embodiment of the present invention (i.e., a display device including the illuminating device of the preferred embodiment of the present invention).

Next, a detailed description of the display device 5 of a preferred embodiment of the present invention will be provided. FIG. 9 is an exploded perspective view showing a schematic configuration of the display device 5 of the present embodiment. The display device 5 of the present embodiment includes the illuminating device 1 of the present embodiment, a display panel assembly 51, and a bezel 52 as shown in FIG. 9. In addition, the display device 5 preferably includes a control circuit board arranged to control the display panel assembly 51 (not illustrated). The top of FIG. 9 is referred to as a front face side of the display device 5 of the present embodiment and constituent elements thereof, and the bottom of FIG. 9 is referred to as a back face side of the display device 5 of the present embodiment for the sake of illustration.

The display panel assembly 51 includes a display panel 511, and circuit boards 512 arranged to drive the display panel 511. The display panel assembly 51 has a configuration that the circuit boards 512 are attached to the display panel 511. A variety of conventional transmissive or transflective liquid crystal display panels can be used for the display panel 511. For example, a variety of conventional transmissive or transflective active matrix liquid crystal display panels can be used. If an active matrix liquid crystal display panel is used as the display panel 511, film circuit boards (e.g., FPC), which incorporate driver ICs (or driver LSIs, generally referred to as "gate drives" or "source drivers") arranged to generate signals to drive switching elements provided to the display panel 511, are preferably used as the circuit boards 512. The circuit boards 512 preferably have a conventional configuration. Thus, descriptions thereof are not provided.

The bezel 52 has the function of keeping the display panel assembly 51 to be attached to the illuminating device 1 of the present embodiment, and the function of protecting the display panel assembly 51. The bezel 52 has a frame shape with an opening from which at least a part of a front face of the display panel 511 (in particular, a region of the display panel 511 where an image is displayed) can be seen from the front face side. The bezel 52 is preferably made of a metal plate that is subjected to press working. It is also preferable that the bezel 52 is made of a resin that is subjected to injection molding. The size and shape of the bezel 52 (in particular, the size and shape of the opening) are determined appropriately in accordance with the size and shape of the display panel 511. The configuration of the bezel 52 is not limited specifically as described above.

The display device 5 of the present embodiment may further include a circuit board arranged to generate signals (sometimes referred to as a "control circuit board") to drive the display panel assembly 51 (not illustrated).

Next, a description of assembly of the display device 5 of the present embodiment will be provided. The display panel assembly 51 is disposed on the front face of the illuminating device 1 of the present embodiment (the front face of the chassis 11). Then, the bezel 52 is disposed on the front face of the display panel assembly 51 and attached to the chassis 11.

In this configuration, the display panel assembly 51 is held between the illuminating device 1 of the present embodiment and the bezel 52. Then, at least a part of the front face of the display panel 511 (at least the region where an image is displayed) can be seen from the front face side through the opening of the bezel 52.

In the display device 5 of the present embodiment, the light emitted from the illuminating device 1 of the present embodiment is projected onto the back face of the display panel 511. Then, the display panel 511 transmits the projected light, whereby an image is displayed visible on the front face of the display panel 511.

Because the display device 5 of the present embodiment has the configuration that intensity distribution in the plane of the light projected onto the back face of the display panel 511 is uniform, development of luminance unevenness in the image displayed in the display panel 511 can be minimized or prevented. Thus, the display device 5 of the present embodiment has excellent image display quality.

Next, a description of a television receiving device 6 including the display device of the present embodiment will be provided.

Figure 10:
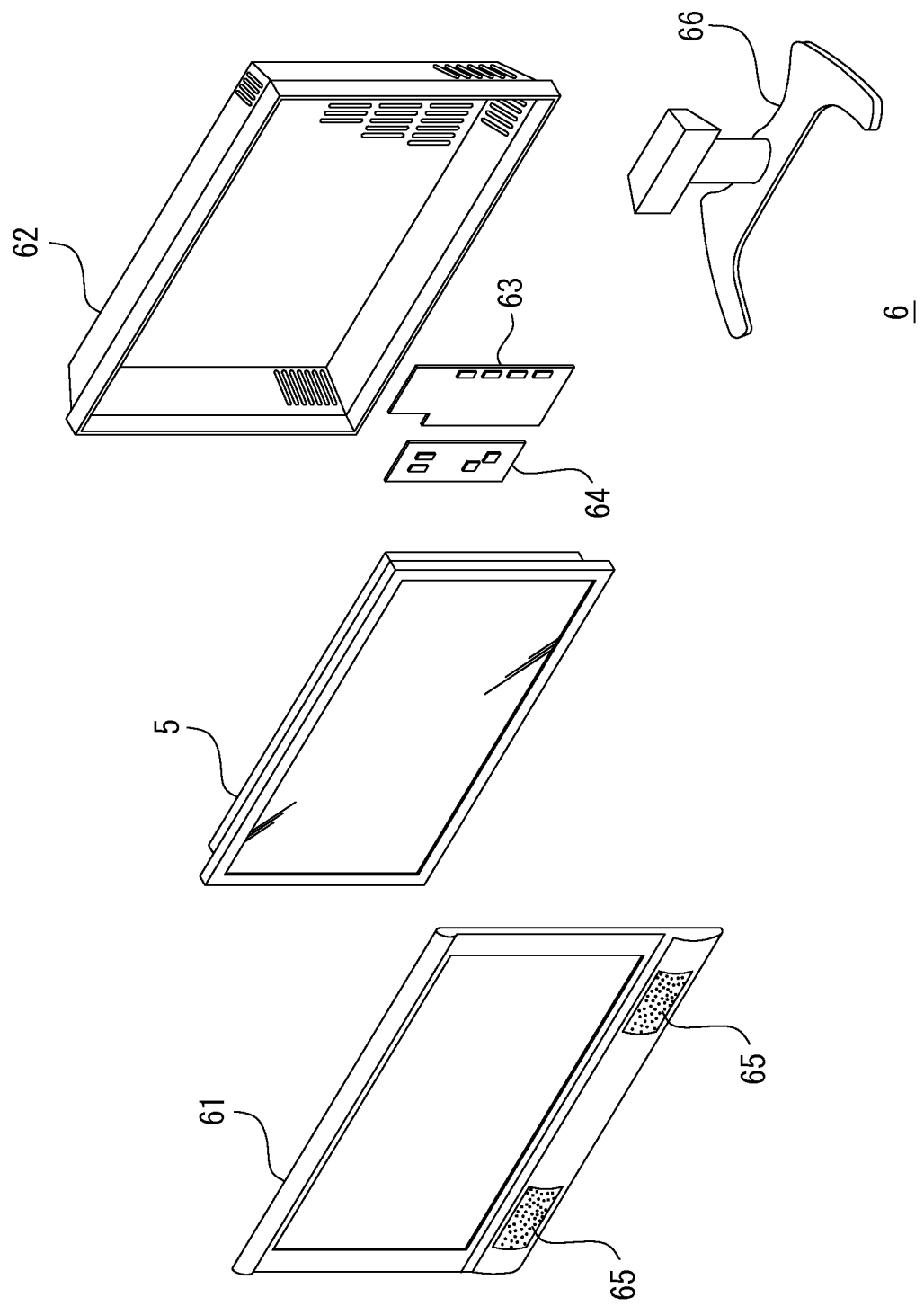
FIG. 10 is an exploded perspective view showing a schematic configuration of a television receiving device including the display device of the preferred embodiment of the present invention.

FIG. 10 is an exploded perspective view showing an example of a schematic configuration of the television receiving device 6 including the display device of the present embodiment. The television receiving device 6 includes the display device 5 of the present embodiment, a power board 63, a tuner 64, loudspeaker units 65, cabinets (a front cabinet 61 and a back cabinet 62), and a supporting member 66.

The power board 63 defines a circuit board arranged to supply power to the display device 1 of the present embodiment and the tuner 64. A circuit board that incorporates a variety of conventional power supply circuits can be used as the power board 63.

The tuner 64 is arranged to produce an image signal and a sound signal of a given channel based on a received radio wave and a signal inputted from the outside. A generally-used terrestrial tuner (analog and/or digital), a BS tuner and a CS tuner are preferably used as the tuner 64.

The display device 5 of the present embodiment is arranged to display an image based on the image signal of the given channel produced by the tuner 64. The loudspeaker units 65 are arranged to produce a sound based on the sound signal produced by the tuner 64. A variety of conventional loudspeaker units such as generally-used speakers are preferably used as the loudspeaker units 65.

Then, the display device 1 of the present embodiment, the power board 63, the tuner 64, and loudspeaker units 65 are housed in the cabinets 61 and 62 (housed between the front cabinet 61 and the back cabinet 62), which is supported by the supporting member 66. The configuration of the television receiving device 6 including the display device 1 of the present embodiment is not limited to the configuration described above. A variety of configurations can be applied to the television receiving device 6. For example, the television receiving device 6 has a configuration that the power board 63, the tuner 64 and the loudspeaker units 65 are incorporated in the display device 1 of the present embodiment.

The television receiving device 6 including the display device 5 of the present embodiment is capable of displaying an image free from luminance unevenness.

INDUSTRIAL APPLICABILITY

The foregoing description of the preferred embodiments of the present invention has been presented for purposes of illustration and description with reference to the drawings.

However, it is not intended to limit the present invention to the embodiments, and modifications and variations are possible as long as they do not deviate from the principles of the present invention.

Described in the preferred embodiments is the illuminating device having the configuration that the light guide member is included, which is quadrangular when seen from the front face side or back face side and includes the entrance face that is defined by the end face that corresponds to one side of the four sides of the quadrangle, and the light sources are disposed opposing the entrance face; however, it is not intended to limit the present invention to the embodiments. It is also preferable that the illuminating device has a configuration that faces that correspond to a plurality of sides of the four sides of the quadrangle define the entrance faces, and the light sources are disposed opposing the entrance faces. Examples of the configuration include a configuration that the light sources are disposed along two opposing sides of the four sides of the light guide member, and a configuration that the light sources are disposed along two adjacent sides of the four sides of the light guide member, and a configuration that the light sources are disposed along all the four sides of the light guide member.

In addition, described in the preferred embodiments is the illuminating device having the configuration that two light sources are disposed along one entrance face of the light guide member (i.e., a face that corresponds to one side of the four sides of the quadrangle); however, it is not intended to limit the present invention to the embodiments. Examples of the configuration include a configuration that one light source is disposed along one entrance face, and a configuration that three or more light sources are disposed along one entrance face.

In addition, described in the preferred embodiments is the illuminating device having the configuration that the light sources are fixed to the light source holding member; however, the illuminating device may have a configuration that the light sources are fixed directly to the chassis. It is essential only that the light sources should oppose the entrance face of the light guide member.

The invention claimed is:

1. An illuminating device, comprising:
a light source comprising:
 a board; and
 a plurality of light-emitting elements mounted on the board; and
a light guide member including an entrance surface opposing the light source, from which light emitted from the light source enters the inside of the light guide member; wherein
the light source includes a non-emitting portion where the light-emitting elements are not disposed;
light projected from a portion of the light source, the portion being close to the non-emitting portion, onto the entrance surface of the light guide member is higher in intensity than light projected from an other portion of the light source onto the entrance surface of the light guide member; and
a space between the light-emitting elements on the portion close to the non-emitting portion is smaller than a space between the light-emitting elements on the other portion.

2. An illuminating device, comprising:
a light source comprising:
 a board; and
 a plurality of light-emitting elements mounted on the board; and
a light guide member including an entrance surface opposing the light source, from which light emitted from the light source enters the inside of the light guide member; wherein
the light source includes a non-emitting portion where the light-emitting elements are not disposed;
light projected from a portion of the light source, the portion being close to the non-emitting portion, onto the entrance surface of the light guide member is higher in intensity than light projected from an other portion of the light source onto the entrance surface of the light guide member; and
spaces between the light-emitting elements get smaller as the light-emitting elements get closer to the non-emitting portion.

3. An illuminating device, comprising:
a light source comprising:
 a board; and
 a plurality of light-emitting elements mounted on the board; and
a light guide member including an entrance surface opposing the light source, from which light emitted from the light source enters the inside of the light guide member; wherein
the light source includes a non-emitting portion where the light-emitting elements are not disposed;
light projected from a portion of the light source, the portion being close to the non-emitting portion, onto the entrance surface of the light guide member is higher in intensity than light projected from an other portion of the light source onto the entrance surface of the light guide member; and
one or more light-emitting elements close to the non-emitting portion are arranged to emit light higher in intensity than the light-emitting elements on the other portion.

4. The illuminating device according to claim 3, wherein
the light-emitting elements comprise LED packages comprising LED chips, and
the number of each LED chip included in the one or more light-emitting elements close to the non-emitting portion is larger than the number of each LED chip included in the other light-emitting elements.

5. The illuminating device according to claim 3, wherein
the light-emitting elements comprise light-emitting elements arranged to emit different kinds of light that are different in intensity, and
the one or more light-emitting elements close to the non-emitting portion comprise the light-emitting elements arranged to emit the light higher in intensity than the light-emitting elements on the other portion.

6. The illuminating device according to claim 3, wherein electric power supplied to the one or more light-emitting elements close to the non-emitting portion is higher than electric power that is supplied to the light-emitting elements on the other portions.

7. The illuminating device according to claim 3, wherein the one or more light-emitting elements close to the non-emitting portion comprise cooling mechanisms.

8. The illuminating device according to claim 3, wherein the light source includes a plurality of light sources disposed side by side, and
each non-emitting portion includes at least one of:
 a printed identification character disposed on each board;
 a screw arranged to fix each board;
 a power supply connector disposed on each board; and
 a space between the boards.

9. The illuminating device according to claim 3, wherein the light source includes a linear light source, and the light guide member includes an optical member arranged to convert light emitted from the light source into planar light to emit the planar light to the outside.

10. The illuminating device according to claim 9, wherein
the board of the light source has a long and narrow strip shape, and
the light-emitting elements are disposed in series in a longitudinal direction of the board.

11. The illuminating device according to claim 9, wherein the light sources surround a periphery of the optical member.

12. The illuminating device according to claim 9, wherein the light sources are disposed at positions opposing each other while sandwiching the optical member.

\* \* \* \* \*